R. Mason,
Mirror.

No. 112,474.  Patented Mar. 7, 1871.

Witnesses: W. M. Gooding, Edward Coleiser

Richard Mason

UNITED STATES PATENT OFFICE.

RICHARD MASON, OF NEWARK, NEW JERSEY, ASSIGNOR TO HIMSELF AND MATTHEW ELY, OF SAME PLACE.

IMPROVEMENT IN BACK-REFLECTING MIRRORS.

Specification forming part of Letters Patent No. 112,474, dated March 7, 1871.

I, RICHARD MASON, of the city of Newark, county of Essex, and State of New Jersey, have made certain Improvements in the Suspendings of Back-Reflecting Mirrors, of which the following is a specification:

My improvements relate to an arrangement and connection of the parts, and to provisions for adjustability of the mirror.

Figure 1:
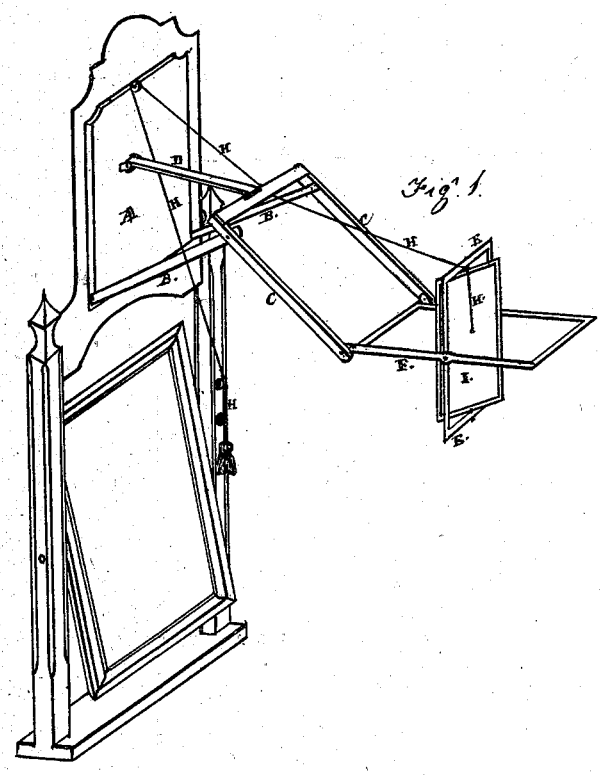
Figure 2:
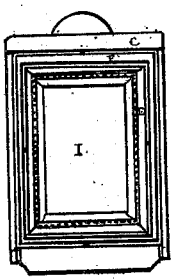

In the accompanying drawing, Figure 1 is the back-reflecting mirror in the position when in use. Fig. 2 is the same when not in use and folded together.

A suitable base, A, that can be attached to a partition or to a wall, (or it can be, as shown in Fig. 1, attached to extended frame-work of a toilet-glass on a bureau, table, or to any suitable stand,) has bars or frame-work B attached at its lower end to each side, and that can turn upon a pin or hinge, the other ends of the bars being attached to a frame, C, at a short distance down from the top bar of the frame C, forming a leverage, and giving the top bar a curving movement in its ascent or descent, which is guided, regulated, and held by the suspending bar or strap D, one end of which is hinged to the middle of the base A, and the other to the top of the frame C, the object of this compound leverage being guiding and bringing the frames into desired position when they are folded, and holding them in the needed position when they are turned down for use. To the bottom end of C is attached a frame, F, that has suspended within it, upon pins in the middle of its length, another frame, E. Inside of the frame E the mirror I is held by pins in the middle of its width, that turn in bearings in the middle of the top and bottom bars of the frame E. The back of the mirror is shown in the drawing, the object of these frames within a frame being facility of adjustment of the mirror I to any angle that may be needed.

A cord, H, is attached to the back of the mirror I, that passes to the top of the base A, thence over a pulley or pulleys to pins within convenient reach of the hand. The drawing in of the cord folds the frames, so that the front of the mirror I is presented to view.

I do not claim combining mirrors with folding frames; but

What I do claim, and desire to secure, is—

The bar D, lever-sided frame C, the frames F and E, and cord H, as and for the purpose specified and shown.

RICHARD MASON.

Witnesses:
WILLM. M. GOODING,
EDWARD COLLVER.